US009632304B2

(12) United States Patent
Waterman et al.

(10) Patent No.: US 9,632,304 B2
(45) Date of Patent: Apr. 25, 2017

(54) DIRECT VIEW OPTICAL SIGHT WITH INTEGRATED LASER SYSTEM

(71) Applicant: RAYTHEON COMPANY, Waltham, MA (US)

(72) Inventors: Michael Waterman, Rowlett, TX (US); Robert B. Chipper, Allen, TX (US); Gilbert J. Islas, Sachse, TX (US); James Allen McIntosh, Sunnyvale, TX (US); John R. Staley, III, Dallas, TX (US); James M. Florence, Dallas, TX (US)

(73) Assignee: RAYTHEON COMPANY, Waltham, MA (US)

( * ) Notice: Subject to any disclaimer, the term of this patent is extended or adjusted under 35 U.S.C. 154(b) by 675 days.

(21) Appl. No.: 14/097,832

(22) Filed: Dec. 5, 2013

(65) Prior Publication Data

US 2016/0223805 A1    Aug. 4, 2016

Related U.S. Application Data

(60) Provisional application No. 61/733,673, filed on Dec. 5, 2012.

(51) Int. Cl.
*G01C 3/08* (2006.01)
*G02B 23/04* (2006.01)
(Continued)

(52) U.S. Cl.
CPC .............. *G02B 23/04* (2013.01); *F41G 1/38* (2013.01); *F41G 1/473* (2013.01); *F41G 3/06* (2013.01);
(Continued)

(58) Field of Classification Search
CPC ... F41G 1/38; F41G 1/473; F41G 3/06; F41G 3/065; F41H 5/20; G01C 3/08;
(Continued)

(56) References Cited

U.S. PATENT DOCUMENTS 5,771,623 A   6/1998  Pernstich et al.
6,583,862 B1  6/2003  Perger
(Continued)

FOREIGN PATENT DOCUMENTS

DE           19949800 A1    4/2001

*Primary Examiner* — Luke Ratcliffe
*Assistant Examiner* — Samantha K Abraham
(74) *Attorney, Agent, or Firm* — Lando & Anastasi, LLP (57) ABSTRACT

A direct view optical sight including an integrated laser rangefinder. One example of the sight includes an eyepiece, an objective providing an optical aperture and configured to direct electromagnetic radiation from a viewed scene to the eyepiece, an erector tube assembly coupled between the eyepiece and the objective, the laser rangefinder configured to transmit and receive laser radiation, and a beam combiner assembly mounted to the erector tube assembly and positioned between the erector tube assembly and the objective, the beam combiner assembly configured to combine the laser radiation and the electromagnetic radiation to allow the laser rangefinder to transmit and receive the laser radiation via the optical aperture of the objective, and to maintain optical alignment of the laser rangefinder and the viewed scene during movement of the erector tube assembly.

13 Claims, 3 Drawing Sheets

(51) Int. Cl.
  *F41G 3/06* (2006.01)
  *F41G 1/38* (2006.01)
  *F41G 1/473* (2006.01)
  *F41H 5/20* (2006.01)
  *G02B 5/20* (2006.01)
  *G02B 7/00* (2006.01)
  *G02B 25/00* (2006.01)
  *G02B 27/01* (2006.01)
  *G02B 27/10* (2006.01)

(52) U.S. Cl.
  CPC ............... *F41G 3/065* (2013.01); *F41H 5/20* (2013.01); *G01C 3/08* (2013.01); *G02B 5/20* (2013.01); *G02B 7/003* (2013.01); *G02B 25/001* (2013.01); *G02B 27/0189* (2013.01); *G02B 27/108* (2013.01)

(58) Field of Classification Search
  CPC ........ G02B 5/20; G02B 7/003; G02B 25/001; G02B 27/0189; G02B 27/108
  See application file for complete search history.

(56) References Cited

U.S. PATENT DOCUMENTS

| | | | |
|---|---|---|---|
| 2004/0134879 A1* | 7/2004 | Kochergin | B82Y 20/00 216/24 |
| 2009/0223107 A1 | 9/2009 | Lin et al. | |
| 2011/0047854 A1 | 3/2011 | Schlierbach | |
| 2011/0099881 A1* | 5/2011 | Jung | F41G 1/38 42/113 |
| 2012/0188557 A1* | 7/2012 | Goodwin | G01N 21/01 356/601 |

* cited by examiner

DIRECT VIEW OPTICAL SIGHT WITH INTEGRATED LASER SYSTEM

CROSS-REFERENCE TO RELATED APPLICATIONS

This application claims priority to and the benefit of co-pending U.S. Provisional Application No. 61/733,673 titled "MULTI-SPECTRAL BEAM COMBINING ZOOM ASSEMBLY" and filed on Dec. 5, 2012, which is herein incorporated by reference in its entirety.

FEDERALLY SPONSORED RESEARCH

This invention was made with U.S. government support under Grant No. W91CRB-10-R-0056 awarded by the U.S. Army. The U.S. government has certain rights in this invention.

BACKGROUND

It is difficult to keep tight alignment between an object scene and laser rangefinders or laser designators while making adjustments such as moving a reticle during bore-sighting or weapon zeroing. For example, when range to a target is found using the laser rangefinder and the ballistic adjustment is made, for targets at longer ranges the vertical change for the ballistic path and the laser path diverge, resulting in the laser aiming point moving out of the sight field of view. If a range update is required, the sight must be mechanically re-set to bring the laser rangefinder back into the field of view.

There have been some attempts to integrate displays and laser rangefinders into rifle sights. One approach has been to mount the projected lasers and other devices separately, and/or to use a separate aperture for the laser rangefinder that is independent of the scene or reticle adjustment. However, if multiple apertures are used, the tolerances between the different systems must be added and make it difficult to maintain alignment at long ranges. Thus, this approach is complicated, and adds expensive mechanical structure that adds significantly to the cost and weight of the sight.

SUMMARY OF INVENTION

Aspects and embodiments are directed to an optical sight in which the laser rangefinder or laser designator beam is maintained in the sight field of view for substantially any ballistic correction using a common aperture optic, and wherein all laser rangefinder and display components are tied to the erector tube of the sight. The sight may be used as a long range rifle sight, for example.

According to one embodiment, a direct view optical sight has an integrated laser rangefinder, and comprises an eyepiece, an objective providing an optical aperture and configured to direct electromagnetic radiation from a viewed scene to the eyepiece, an erector tube assembly coupled between the eyepiece and the objective, the laser rangefinder configured to transmit and receive laser radiation, and a beam combiner assembly mounted to the erector tube assembly and positioned between the erector tube assembly and the objective, the beam combiner assembly configured to combine the laser radiation and the electromagnetic radiation to allow the laser rangefinder to transmit and receive the laser radiation via the optical aperture of the objective, and to maintain optical alignment of the laser rangefinder and the viewed scene during movement of the erector tube assembly.

In one example, the beam combiner assembly is located at a first focal plane of the direct view optical sight. The beam combiner assembly may include a first reflective surface configured to reflect the laser radiation and to transmit the electromagnetic radiation from the viewed scene to the erector tube assembly, and a second reflective surface configured to reflect the laser radiation to and from the first reflective surface. In one example the laser rangefinder includes a laser transmitter configured to transmit the laser radiation via the optical aperture to a target, and a detector configured to receive the laser radiation reflected from the target. The laser transmitter and laser receiver may be mounted to the erector tube assembly.

The direct view optical sight may further comprise a hole mirror having a central opening and positioned between the laser transmitter and the second reflective surface of the beam combiner assembly, the hole minor configured to allow the laser radiation from the laser transmitter to pass through the central opening to the second reflective surface, and a fold minor positioned between the hole mirror and the detector, wherein the laser radiation reflected from the target is reflected from the second reflective surface to the hole mirror, reflected from the hole minor to the fold mirror, and further reflected from the fold minor to the detector.

The direct view optical sight may further comprise a display mounted to the beam combiner assembly, wherein the beam combiner assembly includes a third reflective surface configured to couple the display into an optical path to the eyepiece and to reflect light from the display via the erector tube assembly to the eyepiece. In one example the display is configured to display a ballistic reticle. In another example the display is configured to receive and display at least one of infrared imagery and video imagery.

The direct view optical sight may further comprise a blocking filter selectively movable into an out of the optical path to the eyepiece, the blocking filter configured to block visible electromagnetic radiation from the viewed scene from reaching the eyepiece when positioned in the optical path, the blocking filter further configured to be substantially transparent to the laser radiation. In one example the blocking filter includes a silicon filter. In one example the blocking filter is positioned in front of the objective. In another example the blocking filter is positioned between the objective and the beam combiner assembly.

The direct view optical sight may further comprise at least one magnifying lens housed within the erector tube assembly. The direct view optical sight may further comprise a parallax optical element positioned between the beam combiner assembly and the objective. In one example, the beam combiner assembly further includes a fixed reticle attached to or etched into a front surface of the beam combiner assembly. The direct view optical sight may further comprise a turret attached to the erector tube assembly, the turret configured to provide vertical movement of the erector tube assembly for ballistic adjustment of the direct view optical sight.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an optical device, for example, a rifle sight or weapon scope, having integrated reticle and information displays and a laser rangefinder, which is compact and provides a flexible mechanism for maintaining alignment of the multiple devices as ballistic adjustments are made. According to certain embodiments, the optical device that has the capability to keep displayed imagery and a laser aligned with a scene as the field of view of the optical device is moved or adjusted. In one embodiment, the optical device allows a laser that is aligned to the scene and reticle to be adjusted as a group. This allows adjustments outside the original field of view while maintaining original alignment between the laser, scene, and reticle. In addition, according to certain embodiments, as the optical device changes magnification, the displayed image and fixed reticle maintain relative magnification to an operator's eye. Thus, the displayed imagery may maintain relative magnification to the scene as the magnification is being changed.

Certain aspects and embodiments are directed to a rifle sight with an integrated laser rangefinder and electronic display attached to the sight optics erector tube in order to maintain the laser rangefinder and display always aligned with the observed field of view (FOV) of the sight using a common aperture optic. As discussed in more detail below, by attaching the laser rangefinder to the erector tube in the sight, the position of the laser rangefinder aiming point in the observed field of view remains fixed as the erector tube is adjusted for any ballistic correction needed to make an accurate shot.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
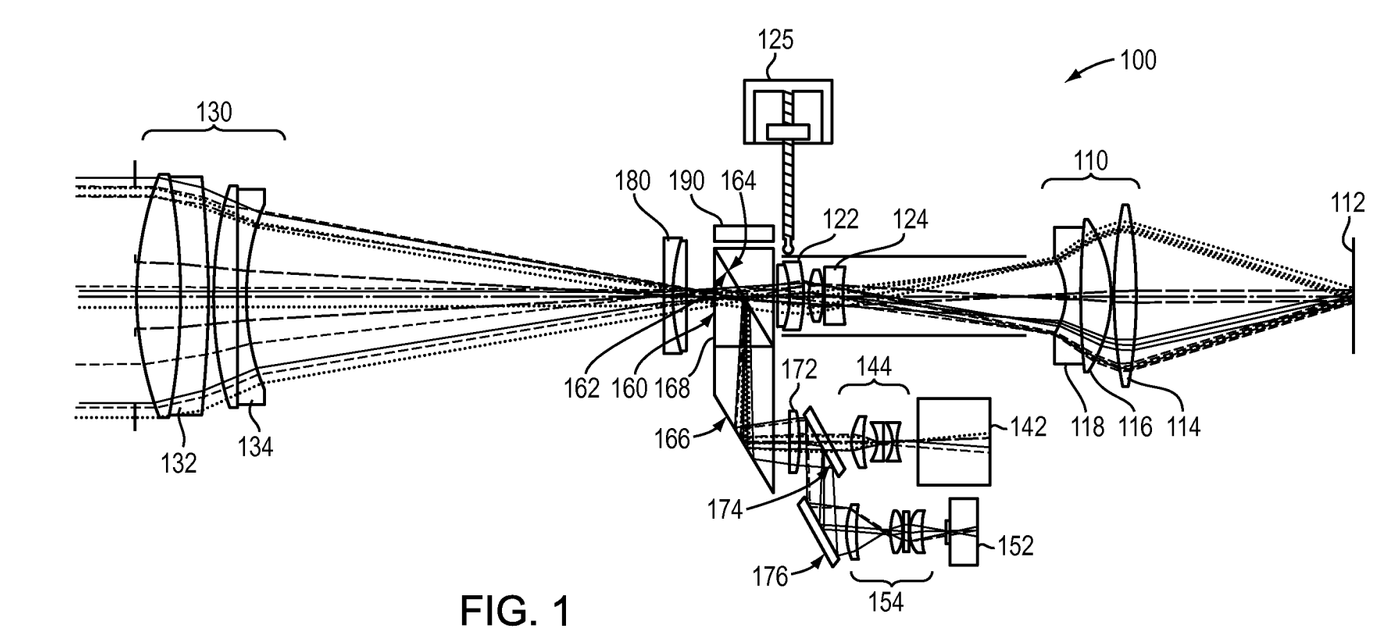
FIG. 1 is a block diagram of one example of an optical sight according to aspects of the invention.

Referring to FIG. 1, there is illustrated one example of an optical device according to certain embodiments that includes a direct view sight and an integrated laser rangefinder that uses a common aperture with the direct view sight. The sight may be used as a long range rifle sight, for example. The optical device 100 includes an eyepiece 110 that focuses electromagnetic radiation from the various device components to the eye of the sight user, which is located at or proximate a rear pupil plane 112. In the illustrated example, the eyepiece 110 includes three lenses 114, 116, and 118; however, in other embodiments, the eyepiece may have a different optical configuration and may include one or more lenses and/or mirrors. The eyepiece 110 is coupled to an erector tube assembly 120 that is mechanically coupled to a turret 125. According to one embodiment, the sight is a magnified sight, and therefore the erector tube 120 houses optical components that provide the magnification or zoom. In the example illustrated in FIG. 1, these components include magnifying lenses 122 and 124, which may be movable along the erector tube 120, towards and away from one another, and/or as a group towards and away from the eyepiece 110, to change the magnification of the sight. In one example, the sight may have a variable magnification from 8× to 22×. In the illustrated example, each of the magnifying lenses 122 and 124 includes a lens pair; however, in other embodiments, the lenses 122 and/or 124 may include single lenses or groups of lenses, or may be replaced with one or more minors. The sight further includes an objective 130 that provides an optical aperture through which electromagnetic radiation may enter and exit the sight. In the illustrated example, the objective 130 includes two lens pairs 132, 134; however, in other embodiments the objective may include other optical configurations of one or more lenses and/or minors.

The optical device includes an integrated laser rangefinder, which includes a laser transmit sub-system and a laser receive sub-system. The laser transmit sub-system includes a laser transmitter 142, and associated optics 144, which may function as a beam expander, for example. The laser receive sub-system includes a detector 152, and associated optics 154. As discussed above, in one embodiment, the laser rangefinder shares a common optical aperture with the direct view optics. The objective 130 may act as a second stage beam expander for the laser rangefinder, and thereby produces a narrower laser rangefinder beam needed to accurate measure range to small targets at long ranges. Accordingly, the optical device 100 includes a beam combining assembly 160 that combines electromagnetic radiation received from a viewed scene and passed to the erector tube assembly 120 with the laser transmit and receive beams to allow all the components to share the common objective 130. The beam combiner assembly 160 may be further configured to split in a high brightness display 190, as discussed further below, as well as providing a path for an eyesafe laser rangefinder transmit and receive.

In one embodiment, the beam combiner assembly 160 is mounted directly or indirectly to the erector tube assembly 120. This mounting approach allows any combined images, reticle or lasers to maintain alignment/bore-sight to each other as the erector tube is adjusted, as discussed further below. A fixed or etched reticle is attached or etched on the front surface of the beam combiner assembly 160, and follows the erector tube assembly 120 during adjustments. This adjustment is to align the reticle to the point of impact of a particular weapon (ballistics adjustment). This adjustment is made by turning the turret assembly 125 which pushes against the erector tube assembly 120. In the example illustrated in FIG. 1, the beam combiner assembly 160 is mounted to the front end of the erector tube assembly 120 at the first focal plane. With this arrangement, the beam combiner assembly 120 is mounted in front of the magnifying or zoom lenses 122, 124. In this way any image coming directly through or combined via the beam combiner assembly 160 is subjected to the same magnification changes. Thus, the displayed imagery and fixed reticle maintain relative magnification to the operator's eyes. The erector tube assembly 120 and beam combiner assembly 16—are mounted behind the objective lens assembly 103 which improves the precision bore-sight alignment between the projected laser and the fixed reticle by a factor equal to the magnification of the objective.

According to one embodiment, a system objective is to provide an optical weapon scope that combines a standard rifle scope with a laser rangefinder and a ballistic reticle. The display 190 may be configured to display an electronic or ballistic reticle, which is projected to the eyepiece 110 via the beam combiner assembly 160 and erector tube assembly 120. The display may also display other imagery and/or information, as discussed further below. As is the case with the fixed reticle attached or etched onto the front surface of the beam combiner assembly 160, because the ballistic reticle from the display 190 is optically coupled to the eyepiece 110 via the beam combiner assembly 160 which is mounted to the erector tube assembly 120, the ballistic reticle, and any additional imagery, from the display 190 remains aligned to the scene during the erector tube movement or bore-sighting of the weapon.

Thus, according to one embodiment, to use the scope, the operator of the system adjusts the scope to have the attached or etched reticle line up with a bullet's point of impact at a known range. After this adjustment (bore-sighting), the operator determines the distance from or range to a specific target, using the laser rangefinder. To do this the operator needs to know where the ranging laser is pointing in order to ensure it is pointed on the target of interest during ranging. Once the system electronics have the range data and other inputs, the amount of bullet drop over the range to the target may be calculated based on that data, and the display 190 projects that information, via the ballistic reticle, to the operator's eye. In one embodiment, the turret 125 includes an absolute position sensor to determine the location of the erector tube assembly 120 after the bore-sight adjustments have been completed. Additional absolute position sensors may be used to determine and identify the locations of the magnification lenses 122, 124. With the laser rangefinder tied to the erector tube assembly 120, the laser aiming point will always stay in the viewed field of view regardless of elevation, windage, or other ballistic adjustments.

The optical device therefore includes components to couple the laser rangefinder to the beam combiner assembly 160. Still referring to FIG. 1, in one embodiment, the beam combiner assembly 160 includes a pair of reflecting surfaces 162, 164, and an additional reflecting surface 166. In one example, the beam combiner assembly 160 includes a beamsplitting cube, which includes the reflecting surfaces 162 and 164, and a prism, rhomboid, or other reflecting device, coupled to the beamsplitting cube and including the reflecting surface 166. The laser radiation (transmit and receive beams) may be coupled into and out of the beam combiner assembly 160 via an optic 172. In one example, the reflecting surface 162 of the beam combiner assembly 160 has a coating to only reflect the laser wavelength of interest and allow all other scene wavelengths to pass through to the eyepiece 110. This coating may have low, high, or notch filtering depending on the specific laser wavelengths or other wavelengths of interest. In the example illustrated in FIG. 1, the laser transmit beam from the laser transmitter 142 is directed through a central opening or hole in a hole mirror 174 to the reflecting surface 166. The laser transmit beam is reflected by the reflecting surface 166 to the reflecting surface 162, which in turn reflects the laser transmit beam to the objective 130, as shown. Returning laser radiation (the receive beam) is directed from the objective 130 to the beam combiner assembly 160, wherein it is reflected by the reflecting surface 162 to the reflecting surface 166. The laser receive beam is reflected from the reflecting surface 166, and then reflected by the hole minor 174 and a fold mirror 176 to be directed to the detector 152. The detector 152 detects the reflected laser receive beam, and provides information to the system electronics to calculate the range to a target.

Those skilled in the art will appreciate, given the benefit of this disclosure, that the arrangement of the hole minor 174 and fold minor 176 is designed to allow the laser transmitter 142 and detector 152 to be co-located, optionally as part of an integrated laser transceiver. Furthermore, the laser rangefinder may be mounted directly to the erector tube assembly 120. However, in other embodiments, a different configuration of mirrors and/or lenses may be used to appropriately direct the laser transmit and receive beams, depending on the relative locations of the laser transmitter 142 and detector 152. Additionally, in other embodiments, the laser rangefinder may be mounted remote from the erector tube assembly, and the laser radiation (transmit and receive beams) may be coupled into the beam combiner assembly via a fiber optic cable or other system, thereby potentially obviating the need for some or all of the mirrors 174, 176, optics 144, 154, and reflecting surface 166. In another embodiment, an additional beam combiner may be assembled in front of the first beam combiner assembly 160 and project the laser or other pointing device via this additional beam combiner instead of via the reflecting surface 166 or a fiber optic cable. Regardless of the exact configuration, arrangement, and mounting location of the laser rangefinder, projecting the laser through the beam combiner assembly 160 advantageously maintains alignment of the laser with the scene during bore-sighting of the weapon, as discussed above.

According to one embodiment, the optical device 100 further includes a parallax optical element 180, which may be positioned between the beam combiner assembly 160 and the objective 130. The parallax optical element 180 may provide range focus, allowing the scene and fixed reticle on the beam combiner assembly 160 to be focused to the same point, and maintains the reticle on the target, even if the operator's eye "jitters" in the eyepiece 110. The parallax optical element 180 may further have range marks or other information printed or etched onto it, to provide further information to the operator. The parallax optical element 180 may also be configured to allow focus to be telecentric such that magnification is maintained with parallax adjustment. In the example illustrated in FIG. 1, the parallax optical element 180 includes a lens pair; however, in other embodiments, this element may include one or more lenses and/or mirrors.

As discussed above, in one embodiment, the optical device includes a display 190 that projects a ballistic reticle and/or other information, such as digital imagery, other symbology, thermal and other sensor imagery, maps, etc., and which is optically coupled to the eyepiece 110 via the beam combiner assembly 160. In one example, the display 190 is located on the side of the beam combiner assembly 160 opposite the laser rangefinder, and is attached to the beam combiner assembly. Electromagnetic radiation from the display is reflected off the surface 164, which may have a low, high, or notched filter coating, and is thus optically overlaid over the scene image at the eyepiece 110. According to one embodiment, video from a sensor (LWIR, SWIR, visible, or other wavelength), or other imagery, may be inserted into the display 190. The video or imagery may be transmitted to the display 190 either wirelessly or via a wired connection.

Figure 2:
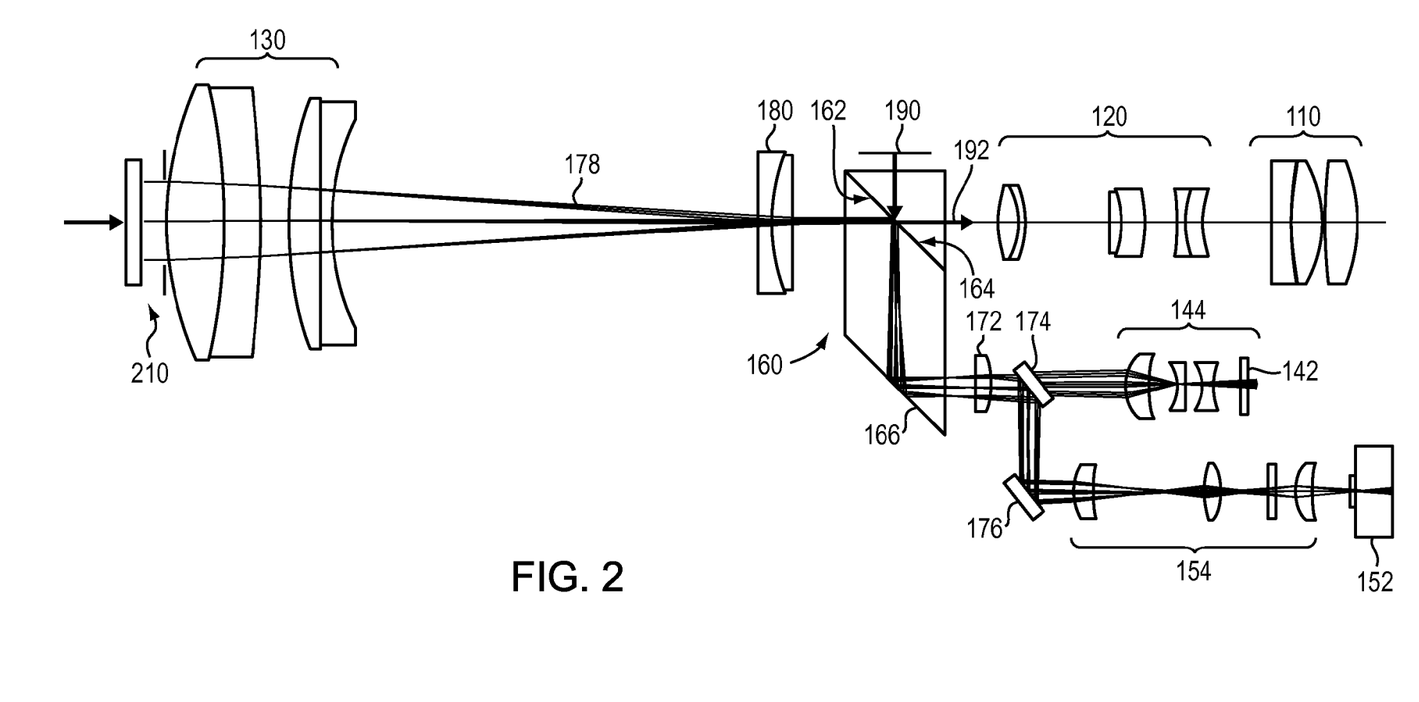
FIG. 2 is a block diagram of another example of an optical sight according to aspects of the invention.

When viewing video or imagery through the display path, it may be necessary to block the objective visible path so that the scene through the objective 130 is not visible. Accordingly, the optical device may include a blocking filter 210, as illustrated in FIG. 2. The blocking filter 210 may be configured to allow the laser transmitted and received energy 178 to pass through the filter, and to block the visible wavelengths. This configuration below allows the full operation of the laser rangefinder through the objective 130, while only presenting visible video/imagery 192 from the display 190 to the operator through the eyepiece 110. The blocking filter 210 may be switchable into and out of the optical path, so as to selectively block incoming electromagnetic radiation from a viewed scene (when in the optical path) and allow the operator to view the scene (when out of the optical path). In one embodiment, the blocking filter 210 includes a silicon filter. Positioning the blocking filter 210 as shown in FIG. 2 has an advantage of there being no boresight shift, because the filter is located in optically collimated space. However, placing the blocking filter 210 proximate the objective 130 and optical aperture, may require a filter having a relatively large diameter, which may result in a heavier filter and make packaging more challenging.

Figure 3:
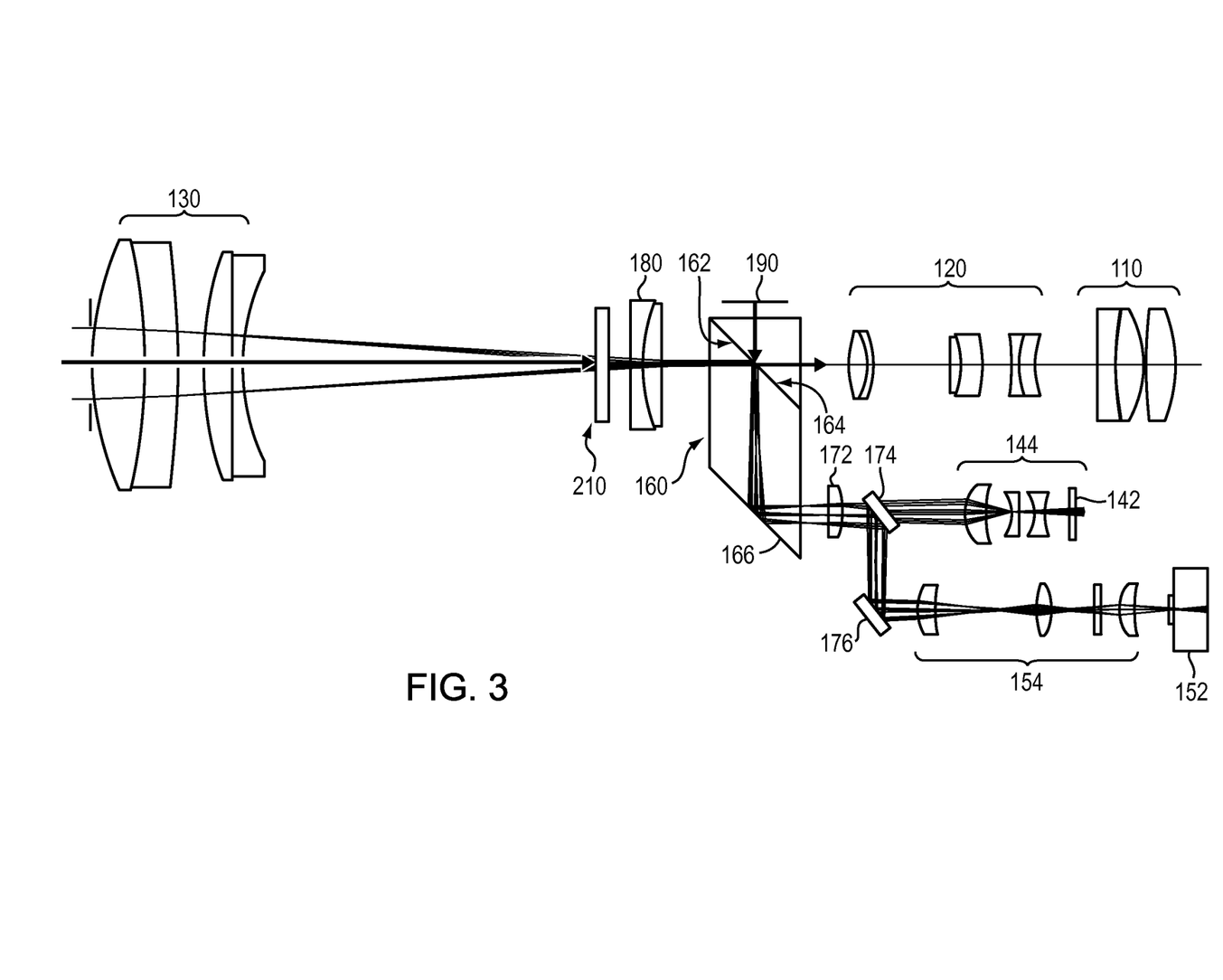
FIG. 3 is a block diagram of another example of an optical sight according to aspects of the invention.

Accordingly, referring to FIG. 3, in another embodiment, the blocking filter 210 may be selectively positioned in the optical path closer to the beam combiner assembly 160, for example, proximate the parallax optical element 180. An advantage of positioning the blocking filter in this location is that a smaller diameter filter may be used, which may reduce the weight of the filter as well as the packaging complexity. However, because the blocking filter 210 at this location is in optically diverging space, any wedge imperfections in the filter may cause a slight boresight error of the laser radiation 178. Accordingly, a system designer may select either position of the blocking filter 210 depending, for example, on the relatively importance of minimal boresight error, and packaging and weight concerns.

Thus, aspects and embodiments provide an optical system, in one embodiment a rifle sight or scope, capable of maintaining alignment of multiple components, such as the laser rangefinder and displayed imagery. In one example, the aiming point must be in the field of view of the highest magnification of the sight; however, there is no other restriction on the location of the laser aimpoint in the sight. By attaching both the laser rangefinder and the ballistic reticle display to the erector tube assembly, both components are constantly aligned with the erector tube assembly during ballistic adjustments. Aspects and embodiments may be particularly useful in connection with long range shooting where the targets are very small. The ability to produce a narrow laser rangefinder output beam and keep it accurately aligned always in the field of view of the sight provides the shooter with an accurate range measurement to the small target in a manner that is easily updated if the target is moving. Furthermore, additional imagery and/or information may be displayed to the operator while also maintaining alignment with the laser rangefinder through the use of a common beam combiner assembly for all optical paths.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, foregoing description and drawings are by way of example only, and the scope of the invention should be determined from proper construction of the appended claims, and their equivalents.

What is claimed is:

1. A direct view optical sight having an integrated laser rangefinder and comprising:
   an eyepiece;
   an objective providing an optical aperture and configured to direct electromagnetic radiation from a viewed scene to the eyepiece;
   an erector tube assembly coupled between the eyepiece and the objective;
   the laser rangefinder configured to transmit and receive laser radiation;
   a beam combiner assembly mounted to the erector tube assembly and positioned between the erector tube assembly and the objective, the beam combiner assembly configured to combine the laser radiation and the electromagnetic radiation to allow the laser rangefinder to transmit and receive the laser radiation via the optical aperture of the objective, and to maintain optical alignment of the laser rangefinder and the viewed scene during movement of the erector tube assembly, wherein the beam combiner assembly includes a first reflective surface configured to reflect the laser radiation and to transmit the electromagnetic radiation from the viewed scene to the erector tube assembly, and a second reflective surface configured to reflect the laser radiation to and from the first reflective surface;
   a display mounted to the beam combiner assembly and configured to receive and display at least one of infrared imagery and video imagery, wherein the beam combiner assembly includes a third reflective surface configured to couple the display into an optical path to the eyepiece and to reflect light from the display via the erector tube assembly to the eyepiece; and
   a blocking filter selectively movable into an out of the optical path to the eyepiece, the blocking filter configured to block visible electromagnetic radiation from the viewed scene from reaching the eyepiece when positioned in the optical path, the blocking filter further configured to be substantially transparent to the laser radiation.

2. The direct view optical sight of claim 1, wherein the beam combiner assembly is located at a first focal plane of the direct view optical sight.

3. The direct view optical sight of claim 1, wherein the laser rangefinder includes a laser transmitter configured to transmit the laser radiation via the optical aperture to a target, and a detector configured to receive the laser radiation reflected from the target.

4. The direct view optical sight of claim 3, wherein the laser transmitter and laser receiver are mounted to the erector tube assembly.

5. The direct view optical sight of claim 4, further comprising:
- a hole mirror having a central opening and positioned between the laser transmitter and the second reflective surface of the beam combiner assembly, the hole mirror configured to allow the laser radiation from the laser transmitter to pass through the central opening to the second reflective surface; and
- a fold mirror positioned between the hole mirror and the detector, wherein the laser radiation reflected from the target is reflected from the second reflective surface to the hole mirror, reflected from the hole mirror to the fold mirror, and further reflected from the fold mirror to the detector.

6. The direct view optical sight of claim 1, wherein the display is configured to display a ballistic reticle.

7. The direct view optical sight of claim 1, wherein the blocking filter includes a silicon filter.

8. The direct view optical sight of claim 1, wherein the blocking filter is positioned on an object space side of the objective.

9. The direct view optical sight of claim 1, wherein the blocking filter is positioned between the objective and the beam combiner assembly.

10. The direct view optical sight of claim 1, further comprising at least one magnifying lens housed within the erector tube assembly.

11. The direct view optical sight of claim 1, further comprising a parallax optical element positioned between the beam combiner assembly and the objective.

12. The direct view optical sight of claim 1, wherein the beam combiner assembly further includes a fixed reticle attached to or etched into a surface of the beam combiner assembly.

13. The direct view optical sight of claim 1, further comprising a turret attached to the erector tube assembly, the turret configured to provide movement of the erector tube assembly for ballistic adjustment of the direct view optical sight.

* * * * *

UNITED STATES PATENT AND TRADEMARK OFFICE
CERTIFICATE OF CORRECTION

PATENT NO. : 9,632,304 B2  
APPLICATION NO. : 14/097832  
DATED : April 25, 2017  
INVENTOR(S) : Michael Waterman et al.

Page 1 of 1

It is certified that error appears in the above-identified patent and that said Letters Patent is hereby corrected as shown below:

In the Specification

At Column 2, Line number 20, delete "minor" and replace with --mirror--.

At Column 2, Line number 23, delete "minor" and replace with --mirror--.

At Column 2, Line number 26, delete "minor" and replace with --mirror--.

At Column 2, Line number 27, delete "minor" and replace with --mirror--.

At Column 4, Line number 36, delete "minors" and replace with --mirrors--.

At Column 4, Line number 42, delete "minors" and replace with --mirrors--.

At Column 6, Line number 22, delete "minor" and replace with --mirror--.

At Column 6, Line number 27, delete "minor" and replace with --mirror--.

At Column 6, Line number 28, delete "minor" and replace with --mirror--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*